US011803351B2

(12) United States Patent
Dickins et al.

(10) Patent No.: US 11,803,351 B2
(45) Date of Patent: Oct. 31, 2023

(54) SCALABLE VOICE SCENE MEDIA SERVER

(71) Applicant: Dolby Laboratories Licensing Corporation, San Francisco, CA (US)

(72) Inventors: Glenn N. Dickins, Como (AU); Feng Deng, Beijing (CN); Michael Eckert, Ashfield (AU); Craig Johnston, Sydney (AU); Paul Holmberg, North Ryde (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 145 days.

(21) Appl. No.: 17/601,199

(22) PCT Filed: Apr. 3, 2020

(86) PCT No.: PCT/US2020/026710
§ 371 (c)(1),
(2) Date: Oct. 4, 2021

(87) PCT Pub. No.: WO2020/206344
PCT Pub. Date: Oct. 8, 2020

(65) Prior Publication Data
US 2022/0197592 A1     Jun. 23, 2022

Related U.S. Application Data

(60) Provisional application No. 62/991,645, filed on Mar. 19, 2020, provisional application No. 62/840,857, filed on Apr. 30, 2019.

(30) Foreign Application Priority Data

Apr. 3, 2019   (WO) ................ PCT/CN2019/081317
Jul. 16, 2019  (EP) .................................... 19186491
Feb. 20, 2020  (WO) ................ PCT/CN2020/076047

(51) Int. Cl.
G06F 3/16        (2006.01)
H04L 65/403      (2022.01)
H04M 3/56        (2006.01)

(52) U.S. Cl.
CPC ............ *G06F 3/165* (2013.01); *H04L 65/403* (2013.01); *H04M 3/568* (2013.01)

(58) Field of Classification Search
CPC ....... G06F 3/165; H04L 65/403; H04L 12/18; H04M 3/568; H04M 3/56
See application file for complete search history.

(56) References Cited

U.S. PATENT DOCUMENTS 6,230,130 B1   5/2001   Castello da Costa
6,683,858 B1   1/2004   Chu
(Continued)

FOREIGN PATENT DOCUMENTS

CN    1143264 C      11/2000
CN    108780653 A    11/2018
WO    2002084645 A2  10/2002

OTHER PUBLICATIONS

Bregman, Albert S. "Auditory Scene Analysis the Perceptual Organization of Sound", Sep. 1994.
(Continued)

*Primary Examiner* — Rasha A Al Aubaidi

(57) ABSTRACT

A communication system, method, and computer-readable medium therefor comprise a media server configured to receive a plurality of audio streams from a corresponding plurality of client devices, the media server including circuitry configured to rank the plurality of audio streams based on a predetermined metric, group a first portion of the plurality of audio streams into a first set, the first portion of the plurality of audio streams being the N highest-ranked audio streams, group a second portion of the plurality of audio streams into a second set, the second portion of the
(Continued)

plurality of audio streams being the M lowest-ranked audio streams, forward respective audio streams of the first set to a receiver device, and discard respective audio streams of the second set, wherein N and M are independent integers.

17 Claims, 9 Drawing Sheets

(56) References Cited

U.S. PATENT DOCUMENTS

| | | |
|---|---|---|
| 7,508,947 B2 | 3/2009 | Smithers |
| 8,255,206 B2 | 8/2012 | Hironori |
| 8,331,585 B2 | 12/2012 | Hagen |
| 8,385,234 B2 | 2/2013 | Eriksson |
| 8,437,482 B2 | 5/2013 | Seefeldt |
| 8,984,156 B2 | 3/2015 | Spencer |
| 9,094,526 B2 | 7/2015 | Krutsch |
| 9,172,796 B2 | 10/2015 | Kumar |
| 9,319,820 B2 | 4/2016 | Boustead |
| 9,445,053 B2 | 9/2016 | Cartwright |
| 9,602,295 B1 | 3/2017 | Weiner |
| 9,654,644 B2 | 5/2017 | Spittle |
| 9,749,473 B2 | 8/2017 | Eckert |
| 9,858,936 B2 | 1/2018 | Cartwright |
| 9,876,913 B2 | 1/2018 | Cartwright |
| 9,998,605 B2 | 6/2018 | Bonarius |
| 10,009,475 B2 | 6/2018 | Cartwright |
| 10,943,594 B2 * | 3/2021 | Kaniewska ............ G10L 19/087 |
| 2007/0133503 A1 | 6/2007 | Boustead |
| 2007/0253558 A1 | 11/2007 | Song |
| 2008/0234844 A1 | 9/2008 | Boustead |
| 2010/0162119 A1 | 6/2010 | Boustead |
| 2012/0076305 A1 | 3/2012 | Virolainen |
| 2014/0240447 A1 | 8/2014 | Cartwright |
| 2015/0052455 A1 | 2/2015 | Boustead |
| 2015/0055770 A1 | 2/2015 | Spittle |
| 2015/0221319 A1 | 8/2015 | Cartwright |
| 2015/0244868 A1 | 8/2015 | Cartwright |
| 2016/0019902 A1 | 1/2016 | Lamblin |
| 2017/0070615 A1 | 3/2017 | Cartwright |

OTHER PUBLICATIONS

Gu, X. et al "peerTalk: A peer-to-peer multiparty voice-over-IP system" IEEE Transactions on Parallel and Distributed Systems, v. 19, No. 4, pp. 515-528, Apr. 2008.

Nagle, A. et al "On-the-fly auditory masking for scalable VoIP bridges" AES 30th International Conference Saariselka, Finland, Mar. 15, 2007, pp. 1-10.

Sekhar, C. et al "Audio mixer for multi-party conferencing in VoIP" IEEE International Conference on Internet Multimedia Services Architecture and Applications, 2009, pp. 1-6.

Simons, D.J. et al "Gorillas in our midst: sustained inattentional blindness for dynamic events" Perception 28: 1059-1074.

Tougas, Y. et al "Auditory Streaming and the Continuity Illusion" Perception & Pscyhophysics, Mar. 1990, vol. 47, Issue 2, 121-126.

Warren, Richard M. "Perceptual Restoration of Missing speech sounds" vol. 167, No. 3917, Jan. 23, 1970, pp. 392-393.

Zhang, Li-Zhuo, et al "Probability based adaptive cross-platform multi-party conference scheme" Journal of Computer Applications, v. 30, No. 10, Oct. 2010, pp. 2825-2827. Abstract only.

* cited by examiner

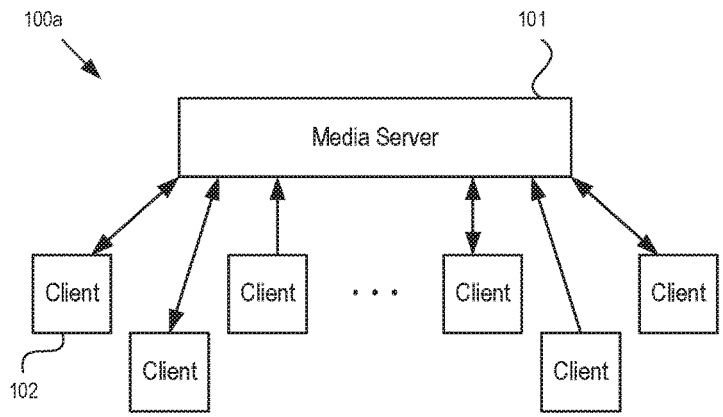
FIG. 1A
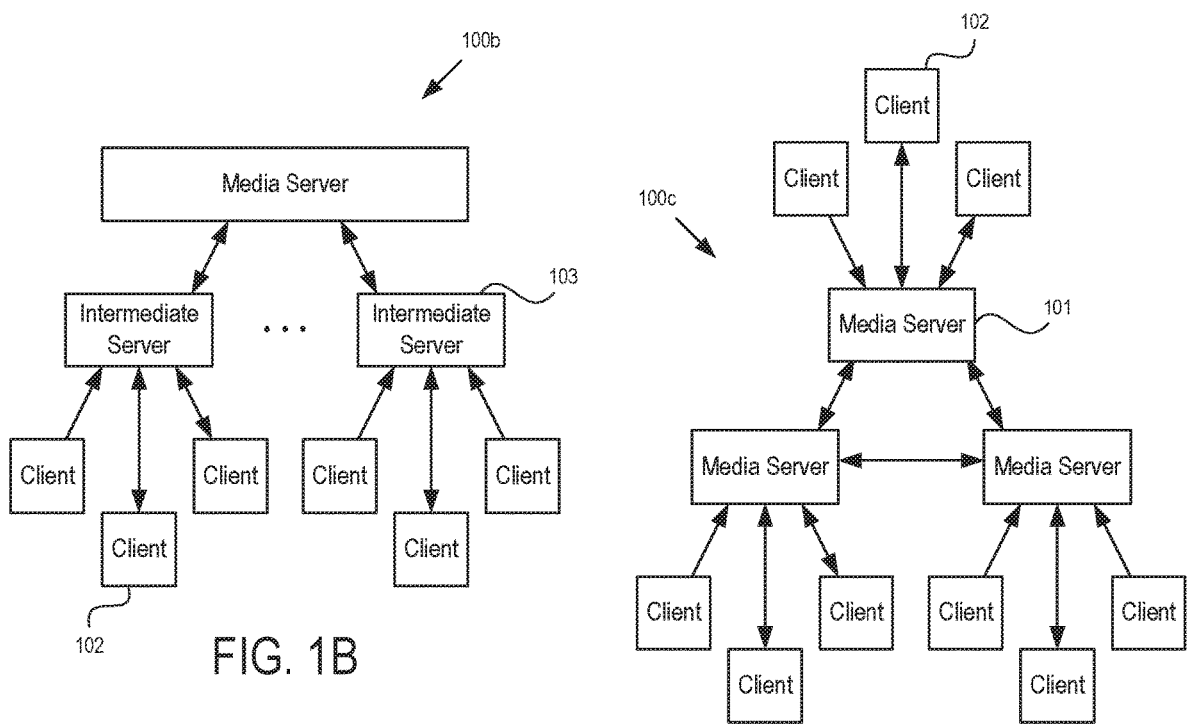
FIG. 1B
FIG. 1C

SCALABLE VOICE SCENE MEDIA SERVER

CROSS-REFERENCE TO RELATED APPLICATIONS

This application claims the benefit of priority to U.S. Provisional Patent Application No. 62/991,645, filed Mar. 19, 2020, U.S. Provisional Patent Application No. 62/840,857, filed Apr. 30, 2019, European Patent Application No. 19186491.7, filed Jul. 16, 2019, and International Application No. PCT/CN2020/076047, filed Feb. 20, 2020, which claims the benefit of International Application No. PCT/CN2019/081317, filed Apr. 3, 2019, all of which are hereby incorporated by reference in their entirety.

BACKGROUND

1. Field of the Disclosure

This application relates generally to multi-party communications. More specifically, this application relates to scalable voice scene media server and method for, among other things, audio and voice communications.

2. Description of Related Art

Video and audio teleconferencing systems may allow multiple parties to interact remotely to carry out a conference. Generally, existing designs of central media servers for audio in voice conferencing use some strategy or combination of strategies in one of two forms.

In one form, by forwarding all incoming audio streams to all participants who will hear that audio stream on a conference, the server is able to avoid all processing load and give the client more flexibility on rendering. However, this approach does not scale and manage downstream bandwidth.

In another form, by mixing incoming streams into the specific mix or spatial audio scene as will be received by each endpoint, and sending only the mix, the server may be able to minimize and have a fixed downstream bandwidth regardless of the number of clients in a conference. However, this approach requires a large amount of processing and audio decoding, mixing, and re-encoding on the server which incurs cost and additional processing delays. Even in cases where such systems attempt to reduce and reuse various processing and mixing operations, this remains a large load. Once mixed, there is limited opportunity for the client to significantly change the perceptual audio scene to one that is different than that provided by the server (e.g., to implement head-tracking).

Systems may involve some combination of the previous two forms, alternating between the use of forwarding for situations where only a few speakers are active, and the use of mixing where many speakers are active. However, such systems may have drawbacks, such as being incapable of providing a sufficient increase in efficiency, scalability, or bandwidth management.

Accordingly, there exists a need for systems and methods to manage the peak and average data bitrate sent to clients without requiring extensive mixing of audio on the server. Furthermore, the exists a need for systems and methods with the ability to individually render the spatial location of each stream into a plausible and perceptually continuous scene regardless of any mixing or culling operations occurring on the server.

BRIEF SUMMARY OF THE DISCLOSURE

Various aspects of the present disclosure relate to circuits, systems, and methods for scalable multi-party communication, including voice communication.

In one exemplary aspect of the present disclosure, there is provided a communication system comprising a media server configured to receive a plurality of audio streams from a corresponding plurality of client devices, the media server including circuitry configured to rank the plurality of audio streams based on a predetermined metric, group a first portion of the plurality of audio streams into a first set, the first portion of the plurality of audio streams being the N highest-ranked audio streams, group a second portion of the plurality of audio streams into a second set, the second portion of the plurality of audio streams being the M lowest-ranked audio streams, forward respective audio streams of the first set to a receiver device, and discard respective audio streams of the second set, wherein N and M are independent integers.

In another exemplary aspect of the present disclosure, there is provided a communication method comprising receiving a plurality of audio streams from a corresponding plurality of client devices; ranking the plurality of audio streams based on a predetermined metric; grouping a first portion of the plurality of audio streams into a first set, the first portion of the plurality of audio streams being the N highest-ranked audio streams; grouping a second portion of the plurality of audio streams into a second set, the second portion of the plurality of audio streams being the M lowest-ranked audio streams; forwarding respective audio streams of the first set to a receiver device; and discarding respective audio streams of the second set, wherein N and M are independent integers.

In another exemplary aspect of the present disclosure, there is provided a non-transitory computer-readable medium storing instructions that, when executed by a processor of a media server, cause the media server to perform operations comprising receiving a plurality of audio streams from a corresponding plurality of client devices; ranking the plurality of audio streams based on a predetermined metric; grouping a first portion of the plurality of audio streams into a first set, the first portion of the plurality of audio streams being the N highest-ranked audio streams; grouping a second portion of the plurality of audio streams into a second set, the second portion of the plurality of audio streams being the M lowest-ranked audio streams; forwarding respective audio streams of the first set to a receiver device; and discarding respective audio streams of the second set, wherein N and M are independent integers.

In this manner, various aspects of the present disclosure provide for improvements in at least the technical field of telecommunications.

This disclosure can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which:

FIGS. 1A-1C respectively illustrate exemplary communication systems in accordance with various aspects of the present disclosure;

DETAILED DESCRIPTION

Figure 2:
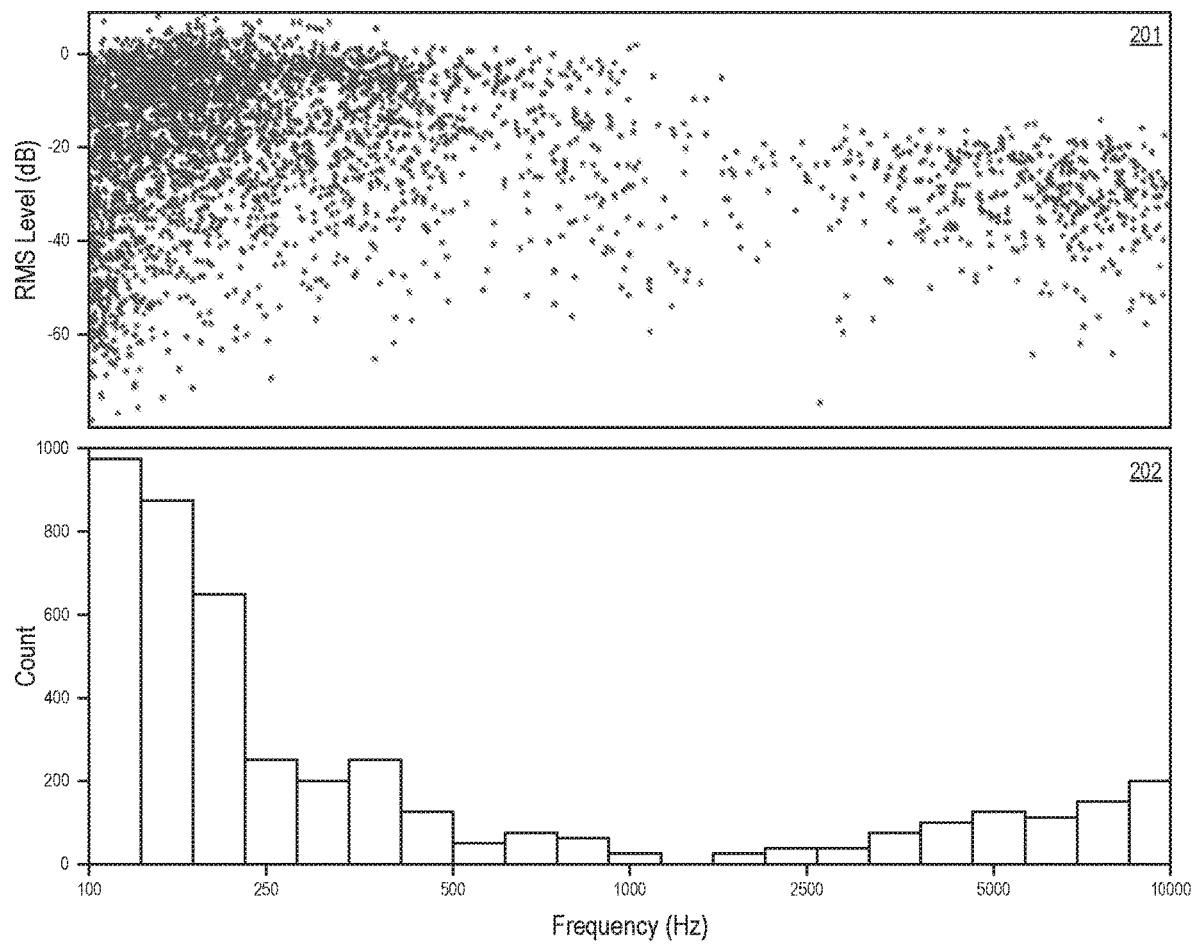
FIG. 2 illustrates a plot of exemplary speech activity data in accordance with various aspects of the present disclosure.

In the following description, numerous details are set forth, such as circuit configurations, timings, operations, and the like, in order to provide an understanding of one or more aspects of the present disclosure. It will be readily apparent to one skilled in the art that these specific details are merely exemplary and not intended to limit the scope of this application. Moreover, while the present disclosure focuses mainly on examples in which the various circuits are used in voice communications, it will be understood that this is merely one example of an implementation. It will further be understood that the disclosed systems and methods can be used in any device in which there is a need to create pervasive audio connectivity for a variety of sound sources and destinations; for example, global communications, the Internet of things, virtual and augmented reality systems, alternate and mixed reality systems, broader collaboration, community growth and support, and so on. Furthermore, the disclosed systems and methods may be applicable to audio-only applications as well as audio in combination with other sensory modalities.

Overview

Various aspects of the present disclosure provide a system in which it is possible to create a high quality and, in some cases, indistinguishable impression of a scene with many simultaneous talkers while transmitting at any point in time only a subset of the actual audio streams. Thus, various aspects of the present disclosure take advantage of aspects of neurological, neurophysiological, and perceptual factors in human hearing to create the illusion of a complete complex scene of voices without exhaustive data transmission or mixing.

Humans tend to group, where possible, components of audio across time and frequency into a smaller set of perceptual objects. That is, humans tend to analyze auditory scenes perceptually in terms of streams, where likeness in space, spectra, temporal behavior, texture, pitch, pitch movement, and the like, cause objects to fuse together. Furthermore, humans are able to sense continuity across the elements of an auditory stream, even when such may not be present in the stimulus.

Phonemic restoration is a factor in the illusion of continuity and how it links to high-level brain functioning and the complete perception of an auditory scene. For example, when a listener is listening to a single speaker and a syllable is obscured or removed from the audio and appropriately masked, the listener will perceive a sound where the removal took place.

For meaningful language, the sound that is perceived will be the sound that makes the most sense for the sentence. "Masked" here refers not to the omission of audio content but rather the covering of a particular sound with another sound or noise. In this manner, the human brain treats the absence of sound (silence) differently from the absence of meaningful audio signals (no content but noise filling the gap). When masked, context of the missing information may be provided by priming and information leading up to the auditory event (in some cases, up to hours before the event), as well as the audio following the event. The phenomenon may be so strong that the listener is convinced that he or she hears (or remembers hearing) the missing sound at the point in the sentence where it was not present. For example, listeners who were exposed to the audio streams "the eel was on the cart" and "the eal was on the table" (where ** indicates a syllable removed and masked from the stream) reported hearing "wheel" and "meal," respectively, although the audio was identical until the final word of the stream.

Thus, where there is missing content that is appropriately masked or filled in from speech, the listener can be robust or even work to invent sounds that would be appropriate to cover for the loss. While the above description is provided with reference to a single speaker, the concepts may be extended to situations in which loss or collisions occur within speech over speech, and the missing components are masked by the presence of other speech.

Change blindness is another factor in the illusion of continuity. Change blindness is the concept whereby a listener is less likely to hear distortion, changes, missing segments, and general manipulations of a sound in time, frequency, or space where there is a large amount of activity or change occurring in an auditory scene. This is a subset of general perceptual science in which studies tend to relate to visual information; however, attention bias and perceptual errors that result therefrom are similar in most senses.

Change blindness is similar and related to the concept of inattention bias. The two concepts are slightly different in that inattention blindness comes from the active and selective attention away from things that may be changing or in error, where change blindness comes from situations in which many events or a large amount of activity occur and it is thus easier to conceal changes.

The above can be summarized as effects of the finite perceptual capacity or effort available to tend to the functions of tracking objects (streaming) and activity (change). In fact, much of what humans consider to be hearing is actually a form of hallucination or construction of sounds from memory that matches, in a plausible way, the listener's current situation and auditory input. When dealing with content that is layered voice-on-voice, these perceptual observations may be leveraged to minimize the amount of information needed to transmit to individual listeners in a communication system to thereby recreate the spatial scene comprised of multiple voices.

Communication System

FIGS. 1A-1C illustrate various examples of a communication system 100a, 100b, or 100c in accordance with various aspects of the present disclosure. Where it is not relevant to distinguish between the particular type, the system may be collectively referred to as communication system 100.

FIG. 1A illustrates a centralized communication system 100a, in which a central media server 101 receives audio streams from a plurality of client devices 102 (only one of which is labeled, for clarity of illustration). The media server 101 further creates a set of output streams for at least a portion of the client devices 102. For systems at a sufficiently large scale, a single media server 101 may not be capable of managing all of the incoming audio streams.

FIG. 1B illustrates a nested communication system 100b, in which a central media server 101 receives audio streams from a plurality of client devices 102 via a plurality of intermediate servers 103. The intermediate server 103 may forward audio streams and/or output streams from/to various subsets of the plurality of client devices 102 with or without processing. FIG. 1C illustrates a shared communication system 100c, in which a plurality of media servers 101 receive audio streams from a plurality of client devices 102, and in which respective ones of the plurality of media servers 101 communicate with one another. While not particularly illustrated in FIG. 1C, the shared communication system 100c may further include intermediate servers depending on the scale of the shared communication system 100c.

In the communication system 100, where a particular client device 102 provides an audio stream but does not receive an output stream, the communication link is illustrated by a single-sided arrow and may be referred to as simplex communication. Where a particular client 102 provides an audio stream and also receives an output stream, the communication link is illustrated by a double-sided arrow and may be referred to as duplex communication. While not expressly illustrated, the present disclosure is also applicable to configurations in which a particular client device 102 receives an output stream but does not provide an audio stream.

Furthermore, in communication system 100, the various communication links may be wired (e.g., via a conductive wire and/or an optical fiber), wireless (e.g., via Wi-Fi, Bluetooth, Near-Field Communication (NFC), and the like), or a combination of wired and wireless (e.g., wired between a microphone and a processor of the client device 102 and wireless between the client device 102 and the media server 101). While FIGS. 1A-1C illustrate a particular number of client devices 102 (both overall and for each media server 101 and/or intermediate server 103), the present disclosure is not so limited and may be applicable to any number of the client devices 102 in any arrangement.

In the communication system 100, audio data representing a voice may include a series of voice frames. For purposes of illustration, an example is here described in which voice frames have either low noise or are appropriately processed to remove noise. It is then possible to consider two features of each frame: the root mean square (RMS) energy of the frame, and the spectral peak or maximum of the frame. In this case, a consideration of the energy in a set of bands that have a constant ratio of bandwidth to frequency leads to a logarithmic spacing of the frequency bands. Over much of the spectrum, this mirrors the nature of perceptual banding such as equivalent rectilinear bandwidth (ERB), Bark Scale, or mel spacing. Because the bandwidth increases linearly with frequency, a constant energy per unit frequency or white noise would have a monotonically increasing power spectrum on such a scale.

FIG. 2 illustrates a scatter plot 201 and a bar graph 202 of exemplary speech activity data in accordance with various aspects of the present disclosure. Specifically, FIG. 1 illustrates speech activity data for a set of sample phrases to represent standard speech activity (the "Harvard sentences"). The scatter plot 201 shows the RMS level of a frame in decibels (dB) as a function of the frequency in Hertz (Hz). More specifically, the scatter plot 201 shows 20 millisecond (ms) frames of the Harvard sentences with ⅓ octave blending. The bar graph 202 shows the data from the scatter plot 201 as count for frequency bands, and only considers frames with energy above the noise floor (approximately −60 dB). As illustrated in FIG. 2, the horizontal axes are on a log-scale whereas the vertical axes are on a linear scale (although dB itself represents a logarithmic value).

As can be seen in FIG. 2, there is a large concentration of high energy frames at low frequencies (<500 Hz). Higher frequency (>2 kHz) content frames are fewer in number, although important to intelligibility and sound localization. As a result, important frames for managing the spatial presence, intelligibility, and overall spectra may be lost if the mixing or culling mechanism does not take this frequency disparity into account. This is consistent with the idea that the voice is a progression of phonemes and the phonemes with a peak at higher frequencies are unvoiced and/or fricative in nature.

Where two or more speech frames overlap, the likelihood of there being a high energy frame at any instant increases. Where a server, such as the media server 100 described above, selects only a subset of the active voice frames for output at any instant, it is possible that the output mix will be dominated by the lower frequency frames. Depending on the subset selected, various situations may occur. For example, the overall spectrum of the mix may become dominated by the low frequency energy and thus sound perceptually dull or less crisp. In some cases, this may even sound to the listener as if the system is losing bandwidth.

Furthermore, the high frequency components that are important for intelligibility (e.g., in fricative or unvoiced sounds) may be lost and reduced from the mix. Moreover, transient or wide band content that is lost may lead to a reduction in the sense of spatial presence and rich immersive audio for cases where the reduced set of streams are spatially rendered at the client.

Perceptual Salience

To avoid the above-noted situations, a weighting or other prioritization scheme is introduced and applied to the speech frames. The prioritization scheme may be based on one or more of a weighted energy, structural features, or verbosity, including combinations thereof, and thereby provide a basis for determining the perceptual salience of a given frame. Weighted energy refers to a spectral tilt or weighting function introduced into the calculation of a frame's energy so as to emphasize higher frequencies. Structural features refer to the consideration of structural and/or semantic relevance of a frame, and include consideration of the timing, in which onset frames are given higher priority, and/or phonetic labeling, in which the prioritization is skewed to emphasize frames that would have higher spectral frequency content and lower energy. Verbosity refers to cases in which the weighting is shifted, biased, or drawn directly from the amount of recent activity or verbosity of a given stream, noting that a stream that includes more recent activity is likely to have a high semantic importance and thus more likely to be the focus of perceptual attention.

As a basis for weighting, consider the scatter plot 201 illustrated in FIG. 2. A typical RMS calculation of this form would be carried out using the sum of the power in either the time samples or frequency bin samples from a block domain transform. In the case of a system using a frequency domain transform, the frequency bins of the transform may be used. Here, the difference between RMS and overall power calculation corresponds to the normalization by the block size and square root operation. Where values are expressed in dB, it is simplest from an explanation standpoint to refer to either the average (per sample) or total (per frame) energy of the audio, despite the square root operation, without loss of generality. Further without loss of generality, the weighting may be explained with reference to only a single channel. For n sample frames, the frame power P may be represented according to the following expression (1):

$$P = \sum_{t=0}^{n-1} |w_t x(t)|^2 = \frac{1}{n}\sum_{k=0}^{n-1} |X(k)|^2 \quad (1)$$

In expression (1), x(t) (t=0, ..., n−1) is the audio; $w_t$ is the windowing function, for example $\sin(\pi(t+0.5)/n)$; and X(k) may be represented according to the following expression (2):

$$X(k) = \sum_{t=0}^{n-1} w_t x(t) e^{-\frac{2\pi itk}{n}} \quad (2)$$

The power P may be calculated from the decoded audio samples in a frame, or it could be present in the encoded audio stream directly. Furthermore, the power P could be extracted from aspects of the audio coding frame, such as the exponent in a frequency domain transform, or from the line spectral pairs or frequency envelope in an auto regressive mode based codec. In some cases, the energy calculated for a frame may include some processing, such as the removal of very low (e.g., <100 Hz) frequencies that are often dominated by noise.

The scatter plot 201 has a two-cluster nature. In order to provide the right-hand cluster of points with more emphasis, a frequency domain weighting function H(k) is introduced. With the weighting function H(k), expression (1) above becomes the following expression (3):

$$P = \sum_{t=0}^{n-1}|w_{t-\tau}x(t-\tau)h(\tau)|^2 = \frac{1}{n}\sum_{k=0}^{n-1}|H(k)X(k)|^2 \quad (3)$$

In expression (3), the weighting function H(k) is represented by following expression (4):

$$H(k) = \frac{1}{n}\sum_{t=0}^{T} h(t) e^{-\frac{2\pi itk}{n}} \quad (4)$$

Above, h(t) is the time domain impulse response. Representing the frequency weighting coefficients as Hk, the power P becomes the following expression (5):

$$P = \frac{1}{n}\sum_{t=0}^{n-1} |H_k X(k)|^2 \quad (5)$$

Figure 3A:
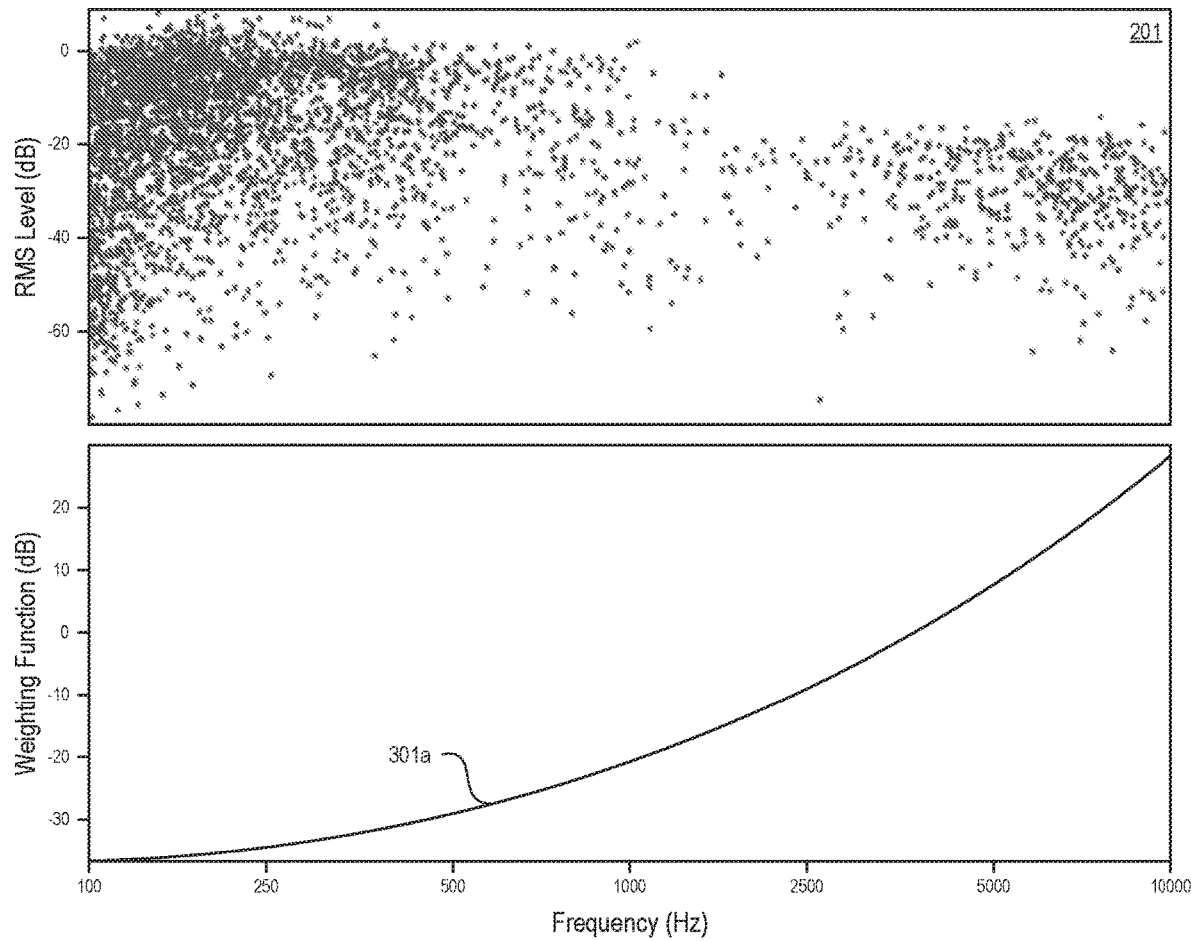
FIGS. 3A-3C respectively illustrate exemplary weighting functions in accordance with various aspects of the present disclosure.
Figure 3B:
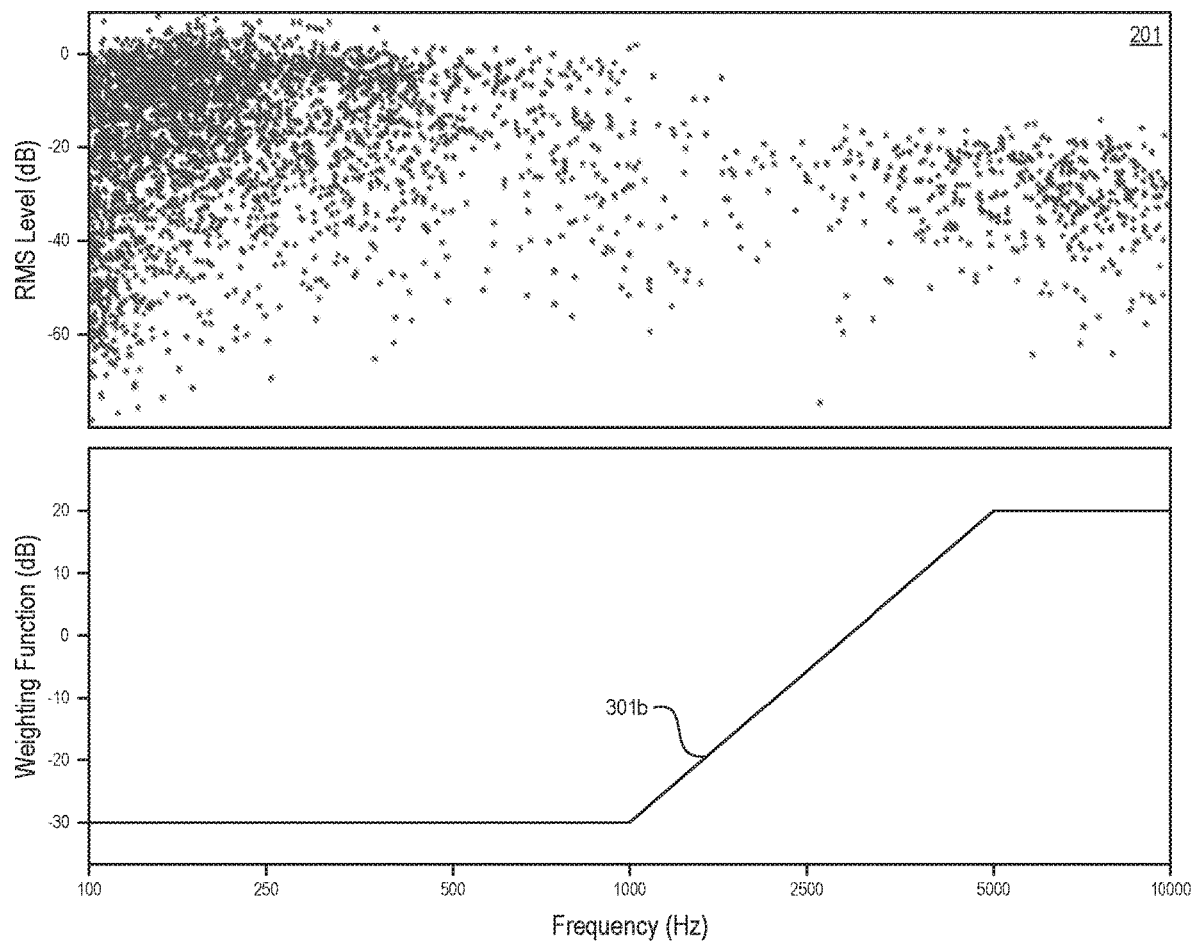
Figure 3C:
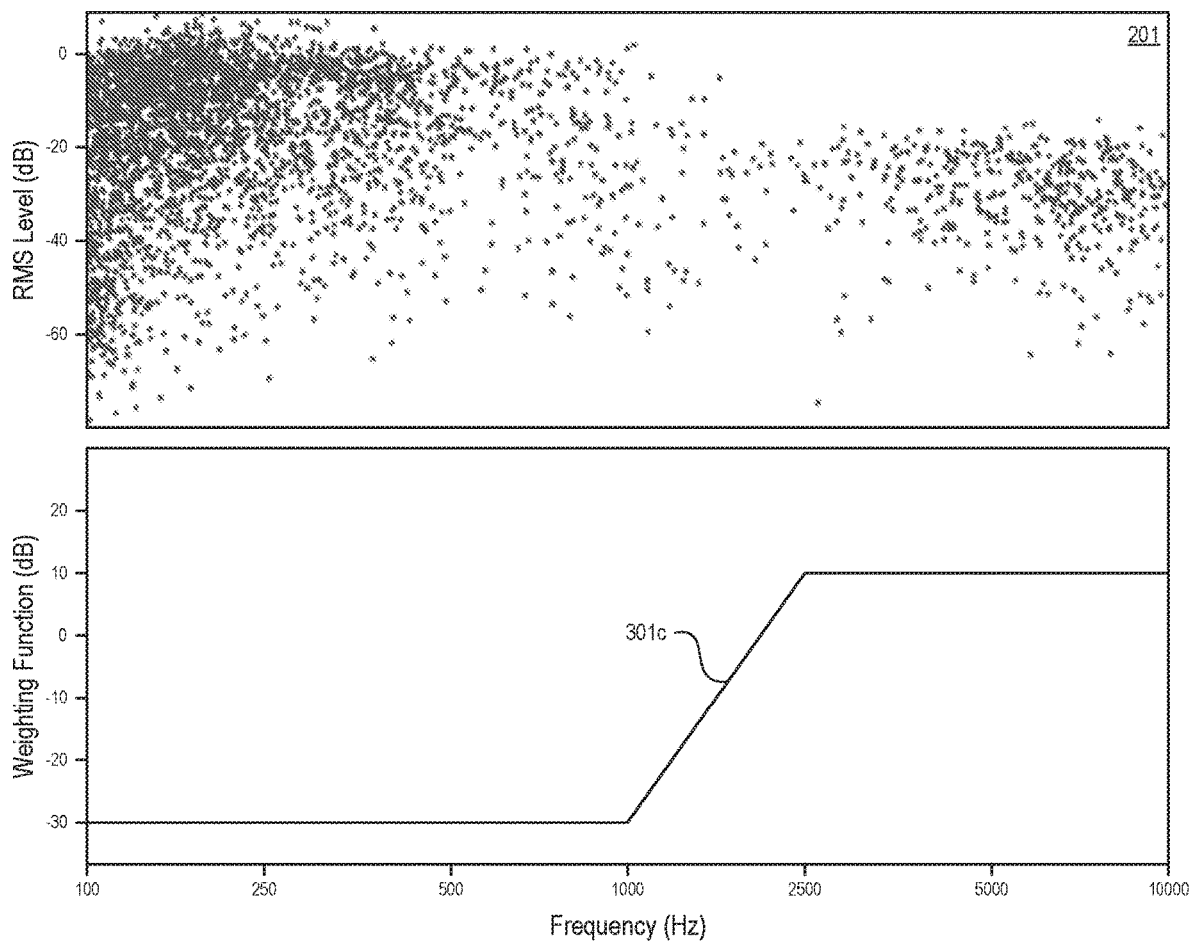

FIGS. 3A-3C illustrate exemplary weighting functions 301a, 301b, and 301c and, for reference, reproduce the scatter plot 201. Where it is not relevant to distinguish between the particular function, the function may be collectively referred to as weighting function 301. For convenience, the weighting function 301 will be described by the frequency weighted coefficients in terms of Hz, noting that the relationship between k and f is determined by the block size and sampling frequency (e.g., k=(n×f)/($F_s$×n)). FIG. 3A illustrates a power weighting function 301a having the particular form $H(f)=((2000+f)/6000)^8$. This function de-emphasizes the content below 1000 Hz and emphasizes the content with energy at 4000 Hz and above. This approach ensures that the lower energy speech frames of high informational content are not lost by the RMS calculation.

The weighting function H(k) is not limited to a power function. For example, FIGS. 3B and 3C illustrate stepwise linear weighting functions 301b and 301c, respectively. The stepwise linear weighting function 301b of FIG. 3B applies a weight of −30 dB to content below 1000 Hz, a weight of 20 dB to content above 5000 Hz, and a linearly-increasing weight therebetween. The stepwise linear weighting function 301b of FIG. 3B applies a weight of −30 dB to content below 1000 Hz, a weight of 10 dB to content above 2500 Hz, and a linearly-increasing weight therebetween. Implemented, the stepwise linear weighting function 301b will apply emphasis to sibilance in speech. The stepwise linear weighting function 301c will apply emphasis to fricatives and key transients. Both the stepwise linear weighting function 301b and the stepwise linear weighting function 301c will de-emphasize voiced and plosive sound.

In any event, the weighting function 301 has the impact of ensuring that the cluster to the right hand side of the scatter plot 201 is scored higher and preferential to the more frequent and higher broadband energy frames on the left hand side of the scatter plot 201. Therefore, a prioritization scheme based on the weighting function 301 preserves frames most relevant to retaining the high frequency content and impression of voice, the intelligibility, and the spatial cues associated with these fricative and transients. Thus, the weighting function 301 remedies the bias of frames away from perceptual salience by de-emphasizing content with a frequency below 1000 Hz and emphasizing content with a frequency above 4000 Hz. In this manner, the weighting function 301 is not limited to the exact forms illustrated in FIGS. 3A-3C.

The calculation of perceptual salience (that is, the application of weighting function 301 to audio data) is preferably performed by the client device, such as the plurality of client devices 102 described above. Thus, the plurality of audio streams uploaded by the corresponding plurality of client devices may include both audio data, which indicates the content of the audio stream, and metadata, which indicates the weighting and/or perceptual salience of the content of the audio stream.

In addition to the weighting function above, the calculation of perceptual salience may include an instantaneous banded signal-to-noise ratio (SNR), onset detection, other event detection, phoneme weighting, verbosity, or combinations thereof.

Instantaneous banded SNR is based on the ideas of noise estimation and power estimation on a frame by frame basis across a set of perceptually spaced (e.g., logarithmically spaced) frequency bands. In principle, the energy in a frame is split from a set of n transform frequency bins into a set of B perceptual bands via a weighting matrix $W_{b,k}$. This may be represented according to the following expression (6):

$$P_b = \sum_{k=0}^{n-1} |W_{b,k} X(k)|^2 \qquad (6)$$

By tracking the minimum or some form of estimate of the recent stationary noise in the signal, it is possible to examine the ratio of signal present to background. This provides a measure in which the activity in each perceptual band b has equal significance regardless of the absolute power in that band or the level of background noise in that band. This may be represented according to the following expressions (7) and (8):

$$S = \sum_{b=0}^{B} \frac{1}{B}\left(\frac{\max(0, P_b - N_b)}{P_b}\right) \qquad (7)$$

$$N_b = \min(P_b|_{t=0}, P_b|_{t=-1}, P_b|_{t=-2}\ldots) \qquad (8)$$

Above, S represents a value of signal activity based on perceptual bands and $N_b$ represents the recent stationary noise in the signal.

Onset detection is based on an analysis of a previous frame so as to express the activity in terms of scoring a positive difference when the energy in the current frame, adjusted by the stationary noise, is significantly higher than the previous frame. This may be included in the characterization of $N_b$ of expression (8) above, including replacing the expression (8) by an average of a few recent frames of $P_b$. In this manner, the signal activity S would be biased towards counting only the bands that had a recent onset or increase in energy.

Other forms of event detection may be based on a classification of speech activity. In such a classification, additional features related to the spectral shape and/or the statistical parameters mean and variance may be extracted from the base features. In one example, a classifier may be based on the boosting of features to create a decision boundary. The classifier may additionally or alternatively be based on a spectral flux, which is a measure of the extent that frames are alternating between the low frequency and high frequency spectral peaks over time. In this manner, the spectral flux adds an emphasis towards the frames a listener would tend to notice to be missing with another energy measure.

Additionally or alternatively, a client device such as the client devices 102 described above may be provided with the capability to perform speech analytics, which may provide an instantaneous estimate of which phoneme is present at the input. In one such example, the client device may weight phonemes based on their entropy, giving phonemes that occur less frequently or for shorter durations a higher score. This would provide a shift in the selection of speech toward more salient frames for preserving high frequency content and spatialization.

The selection of streams may also be biased toward preserving those streams which have been most recently active (or verbose). Verbosity biasing may be measured based on an increase in the verbosity of a given stream for the periods in which it is active while other streams are not active. One non-limiting example of an algorithm for determining verbosity V outputs a value between 0 and 1, saturating at either extreme for normalization purposes. A higher value indicates the endpoint has been more active, and thus is more likely or suitable to be sustained as a recently active soundfield in the output mix. Verbosity may be modified at each frame or instant in time according to a set of parameters; however, the present disclosure is not particularly limited in which parameters may be selected or included. Generally, the verbosity V will increase when an endpoint is active, and may increase more quickly if it is the only active endpoint at a given time. In the case of no activity, it may be possible to maintain the levels of verbosity V or to have a decay and link the decay to a fading out of the associated soundfield.

In one example, the bias or emphasis resulting from a high value of verbosity V is equivalent to 6 dB of greater power or weighted perceptual salience (P) from the above expressions. This may be represented by the following expression (9):

$$P(db) = 10 \log_{10}(P) + 6V \qquad (9)$$

In expression (9), the scaling of verbosity V is exemplary and not limiting. Instead of a scaling of 6 as above, the scaling may be anything from 3 to 10 dB.

Any combination of the above calculations may be performed in the client devices, in the intermediate servers, or in the media server. Furthermore, the combinations may be performed using a combination of devices. In one example, the calculation of perceptual salience prior to any verbosity shift may be performed at the client device, and further shifting may be performed at a server. The weighting may further be encoded in a series of bits; for example, with a 3-bit binary code x ranging from (000) to (111), the weighting may be encoded as $P = -35 + 5x$. Such encoding may facilitate the media server in ranking packets, as will be described in more detail below.

It is possible to acquire any of the above data, such as the frame RMS, without analyzing the entire frame. For example, in a frequency domain, it is possible to extract the frame RMS using only the envelope. In a speech-style encoder, it is possible to derive information from the excitation vector and linear predictive coding (LPC) parameters.

The weighting schemes described above are directed to voice packets, primarily. In cases where voice-based weighting provides more sensitivity than desired (e.g., certain cases of noise of non-voice audio), it is possible to only apply the weighting schemes where the device performing the weighting is confident that the signal includes voice activity.

Mixing and Stream Selection

A server device, such as the media server 101 described above, receives and processes the plurality of audio streams uploaded by the corresponding plurality of client devices. Such processing includes the selection of a subset of audio streams to forward and/or mix at the server device instantaneously. Based on the principles described above, it is possible to create a convincing and sometimes perceptually-indistinguishable rendition of a stream by using only a subset of the potentially active streams.

Figure 4:
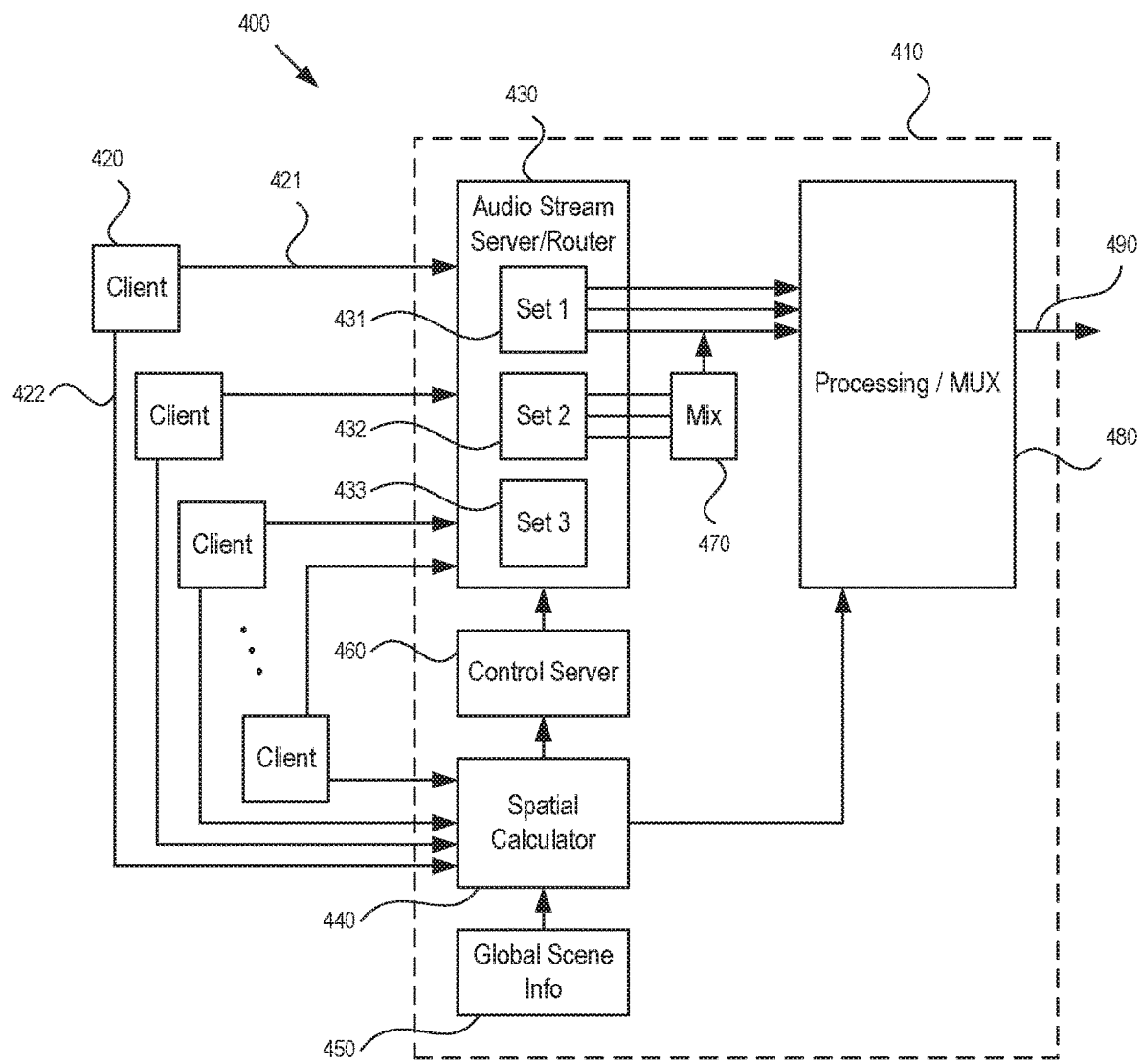
FIG. 4 illustrates another exemplary communication system in accordance with various aspects of the present disclosure.

FIG. 4 illustrates an exemplary communication system 400 in accordance with various aspects of the present disclosure which may implement such processing. The communication system 400 may be the same as or similar to the communication systems 100 described above. The communication system 400 includes a server device 410, which may be the same as or similar to the media server 101, and a plurality of client devices 420, which may be the same as or similar to the client devices 102.

Each of the client devices 420 provides an audio stream to the server device 410 which includes an audio data 421 and a metadata 422. While FIG. 4 illustrates the audio data 421 and the metadata 422 using different arrows, in practice the audio stream may include the audio data 421 and the metadata 422 encoded into a single data stream. The metadata 422 may include data indicative of a weighting and/or perceptual salience, data indicating a spatial position in a scene, and/or other data. Furthermore, some data may be included within the audio data 421 while other data is included within the metadata 422. In one non-limiting example, the audio data 421 includes data indicative of the weighting and/or perceptual salience whereas the metadata 422 includes spatial position data.

The server device 410 includes an audio stream server/router 430, a mixer 470, and a processing and/or multiplexing unit 480. In cases where spatial rendering is performed, the server device 410 may include a spatial calculator 440, a global scene information unit 450, and a control server 460. The audio stream server/router 430 receives the audio data 421 from the plurality of client devices 420 and categorizes the data into a plurality of sets 431-433. The categorization may be based on data included in the audio data 421, the metadata 422, or both. Furthermore, while FIG. 4 illustrates three sets 431-433, the present disclosure is not so limited. In some aspects of the present disclosure, only two sets (or four or more sets) may be provided. The audio stream server/router 430 may perform the categorization by first ranking the plurality of audio streams based on a predetermined metric, such as the weighting or perceptual salience described above, and grouping the audio streams based on their rank.

In one exemplary aspect of the present disclosure, the audio stream server/router 430 receives L audio streams from L client devices 420, groups the N highest-ranked audio streams into the first set 431, groups the M lowest-ranked audio streams into the third set 433, and groups audio streams of intermediate rank into the second set 432. Above, L, M and N are independent integers, such that L≥M+N. The audio streams of the first set 431 may be forwarded as an output stream 490 to one or more receiver devices via the processing and/or multiplexing unit 480; and the audio streams of the third set 433 may be discarded or ignored.

In some aspects of the present disclosure, audio content of audio streams of the second set 432 are mixed into one of the audio streams of the first set 431, thereby to be forwarded as part of the output stream 490. The second set 432 may be mixed into the lowest-ranked stream of the first set 431, for example. The number of streams in each set is not particularly limited. In some cases, the first set 431 may include only a single stream; in other cases, the first set 431 may include a plurality of streams. The receiver device may be any one or more of the plurality of client devices 420 and/or an additional device separate from the plurality of client devices 420.

In some instances, N or M may be zero. That is, at a given point in time, none of the input audio streams may include salient content, in which case the first set 431 would be empty (N=0). Such a situation may occur, for example, when the audio streams corresponding to all of the client devices 420 include relevant audio content or voice data that should be forwarded as part of the output stream 490. Furthermore, at a given point in time, all of the input audio streams may include salient content, in which case the third set 433 would be empty (M=0). Such a situation may occur, for example, when the audio streams corresponding to all of the client devices 420 are silent or include only non-voice data.

The server device 410 may receive all of the audio streams from the plurality of client devices 420 and perform an instantaneous check of the received streams in each audio codec frame, thereby to determine the streams that are relevant to the receiver device. The sets may be updated at the audio frame rate or at a rate slower than the audio frame rate. Moreover, in cases where there are multiple receiver devices, the server device 410 (e.g., by the control server 460) may calculate the sets 431-433 independently for each receiver device. Information from the spatial calculator unit 430 may be provided to the processing and/or multiplexing unit 480 to be included in the output stream 490.

Respective ones of the client devices 420 which act as a receiver device may have multiple instances of codecs to suit the possible incoming streams. In this case, however, the client devices 420 need not have codecs to cover all potential sources, but rather may include a number of codecs sufficient to ensure that there is a relative continuity of the decoded audio and spatial rendering if/when streams are stopped and started by the instantaneous selection of streams to transmit at the server device 410. A stream that is stopped abruptly may require one to two frames to run through the codec to fade out or return to a neutral state.

In the case of a frequency domain codec, this amounts to flushing the decode frame buffer which has the fading-out part of the overlapped window. In the case of a model or deep neural network (DNN) based codec, this may be a short extrapolation of the current and recent stream model trajectory, coupled with an appropriate fadeout.

Figure 5:
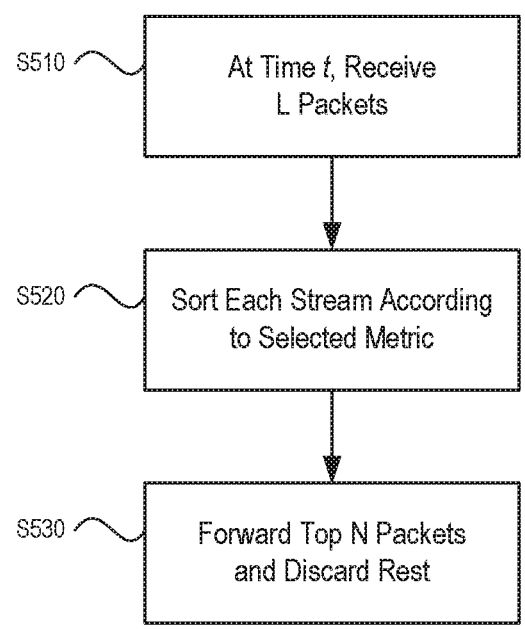
FIG. 5 illustrates a process flow of an exemplary communication method in accordance with various aspects of the present disclosure.

FIG. 5 illustrates an exemplary algorithm for determining the sets, such as the sets 431-433 illustrated in FIG. 4. FIG. 5 illustrates an exemplary algorithm by which the N most salient streams are forwarded to the client devices. At step S510, a server device such as the server device 410 of FIG. 4 receives a number of packets L. At step S520, the server device sorts the received packets according to a selected metric. Step S520 may include first ranking the plurality of packets based on a predetermined metric, such as the weighting or perceptual salience described above, and grouping the audio streams based on their rank such that the N most salient streams are grouped into a first set. At step S530, the packets of the first set are forwarded to a receiver device and the remaining packets are discarded or ignored.

Figure 6A:
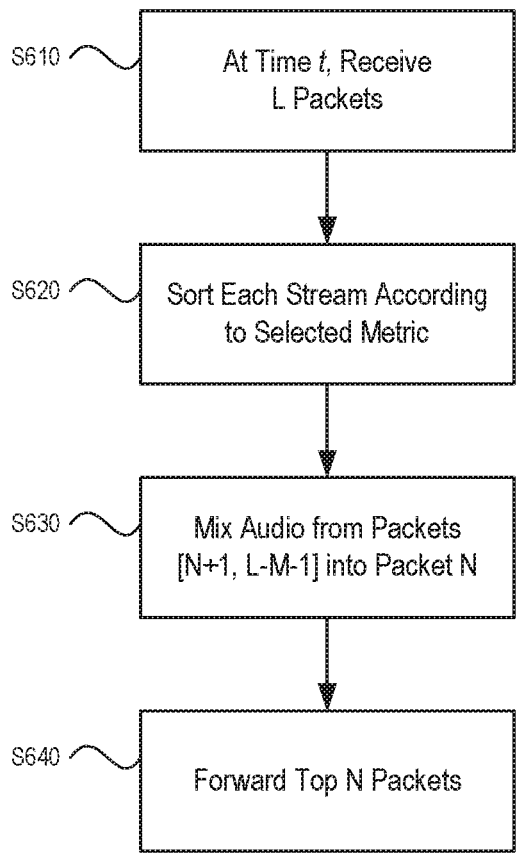
FIG. 6A illustrates a process flow of another exemplary communication method in accordance with various aspects of the present disclosure.

FIG. 6A illustrates an exemplary algorithm by which the N most salient streams are forwarded to the client devices, and audio from intermediate-salience streams are included as a mix. At step S610, a server device such as the server device 410 of FIG. 4 receives a number of packets L. At step S620, the server device sorts the received packets according to a selected metric. Step S620 may include first ranking the plurality of packets based on a predetermined metric, such as the weighting or perceptual salience described above, and grouping the audio streams based on their rank such that the N most salient streams are grouped into a first set, intermediate-salience streams are grouped into a second set, and the M least salient streams are grouped into a third set. At step S630, the audio from the intermediate-salience streams (that is, streams that are neither the N most salient nor the M least salient) are mixed into the least-salient packet of the first set. Where the number of total packets is L, the number of most-salient packets is N, and the number of least-salient packets is M, the intermediate-salience streams may be denoted as the set [N+1, L−M−1] and the least-salient packet of the first set may be denoted as packet N. At step S640, the packets of the first set, which include audio from the second set as a mix, are forwarded to a receiver device and the remaining M packets are discarded or ignored.

While, as noted above, N and M are not particularly limited, in some aspects of the present disclosure N may be equal to two or three.

There are cases where streams that are forwarded from the server need to fit within a maximum total bit rate. In these cases, one must decide how to allocate bits between streams.

Figure 6B:
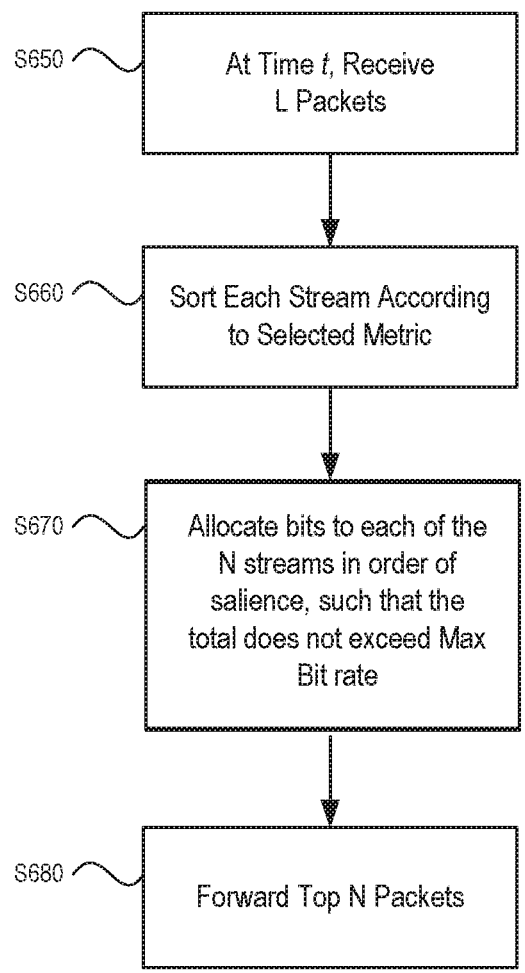
FIG. 6B illustrates a process flow of another exemplary communication method in accordance with various aspects of the present disclosure.

The preferred approach is to allocate more bits to streams of higher salience. FIG. 6B illustrates an exemplary algorithm for allocating bits between individual streams when the total of the N forwarded streams must be limited to a fixed pre-determined maximum bit rate. In this case, the allocation of bits to each stream is ordered according to the salience metric, e.g. based on the weighted energy, such that each stream of lower salience, receives an equal or lower number of bits than allocated to a higher salience stream. For example, if one specifies a total 'bit bucket' of 48 kbps with a limit of three streams, then one might allocate 24 Kbps to the first stream, 12 Kbps to the second and third streams. In this case, the 24 kbps would be allocated to the stream with highest salience and the 12 Kbps each to the packets with the lowest salience. At step S650, a server device such as the server device 410 of FIG. 4 receives a number of packets L. At step S660, the server device sorts the received packets according to a selected metric. Step S660 may include first ranking the plurality of packets based on a predetermined metric, such as the weighting or other perceptual salience metric described above, and grouping the audio streams based on their rank such that the N most salient streams are grouped into a first set, intermediate-salience streams are grouped into a second set, and the M least salient streams are grouped into a third set. At step S670, the server device allocates bits to each of the N streams in order of salience, such that the total does not exceed max bit rate. At step S680, the packets of the first set, which include audio from the second set as a mix, are forwarded to a receiver device and the remaining M packets are discarded or ignored.

Figure 7:
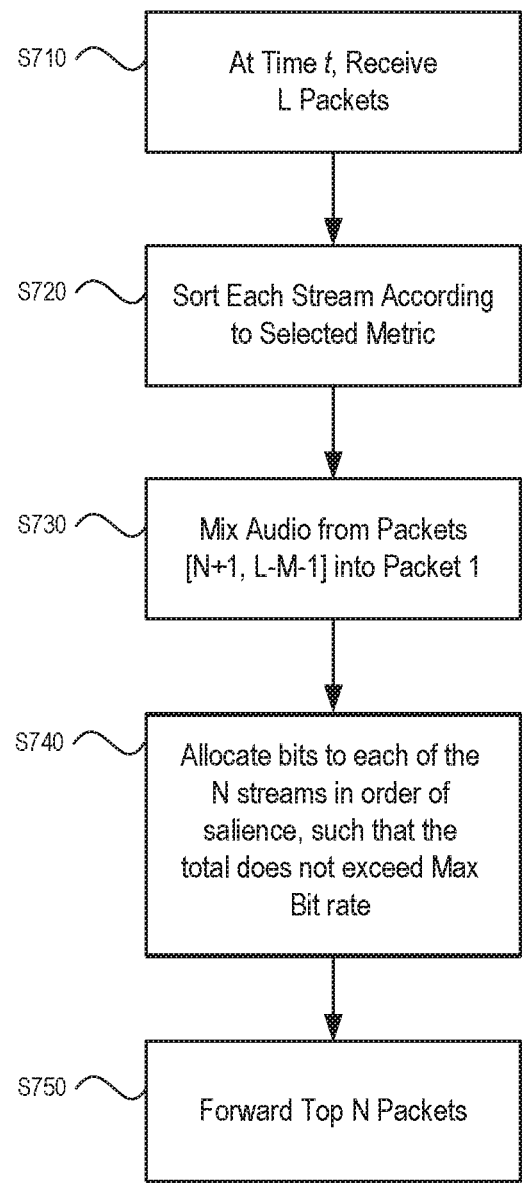
FIG. 7 illustrates a process flow of another exemplary communication method in accordance with various aspects of the present disclosure.

While, as noted above, N and M are not particularly limited, in some aspects of the present disclosure N may be equal to two or three FIG. 7 illustrates another exemplary algorithm for allocating bits between individual streams when the total of the N forwarded streams must be limited to a fixed pre-determined maximum bit rate. In this algorithm, the streams below the threshold are mixed into the highest salience packet and the bits are then allocated to each stream in order of salience, where a stream of lower salience receives equal or lower number of bits than a stream of higher salience. At step S710, a server device such as the server device 410 of FIG. 4 receives a number of packets L. At step S720, the server device sorts the received packets according to a selected metric. Step S720 may include first ranking the plurality of packets based on a predetermined metric, such as the weighting or perceptual salience described above, and grouping the audio streams based on their rank such that the N most salient streams are grouped into a first set, intermediate-salience streams are grouped into a second set, and the M least salient streams are grouped into a third set. At step S730, the audio from the intermediate-salience streams (that is, streams that are neither the N most salient nor the M least salient) are mixed into packet 1, which corresponds to the highest salience stream. At step S7400, the server device allocates bits to each of the N streams in order of salience, such that the total does not exceed max bit rate. At step S750, the packets of the first set, which include audio from the second set as a mix, are forwarded to a receiver device and the remaining M packets are discarded or ignored.

While, as noted above, N and M are not particularly limited, in some aspects of the present disclosure N may be equal to two or three.

Applications

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

The above examples have been described primarily with regard to the management and rendering of voice scenes; however, the present disclosure should not be read as only applicable or specific to voice content. The concepts described in the present disclosure may be extended generally to any signals of a highly-transient nature, including semantic and potentially interactive information content. The above descriptions of the human perception of voice and voice-like sounds are provided as examples and not restrictions of the system use.

Furthermore, while the present disclosure generally mentions aspects of spatial information in terms of the recombination and rendering of audio at the end client, the present disclosure may be extended to situations where there are audio streams that have either explicit information about their intended position in the stream, an identifier and client-side information or decisions about where to render the stream, or some combination of both of these together. The information may further be combined with additional scene control information from other audio control systems. In this manner, the spatial application represents a superset which also encompasses mono, where most of the directional and/or distance information intended to control the rendering may be ignored or not present. Where a scene is rendered using spatial audio techniques to create a spatial image to the user, the audio may be delivered in many different ways. For example, the audio streams may be delivered over headphones (binaural) and simulate the acoustic propagation and spatial acoustics that would occur if the sound truly were present near the user; alternatively, the output of several speakers positions around a listener may be controlled to create a sense of an approximate or perceptually effective soundfield.

The present disclosure refers to a set of audio streams, each coming from a particular source which may have activity independent from the other sources. However, each of these audio streams need not represent only one audio channel. The audio streams themselves may have characteristics of spatial audio already partially encoded within them; for example, a stream may be binaural audio or some form of multichannel spatial audio. Furthermore, within a given stream there may be additional layers and a hierarchical approach to representing fidelity both in terms of signal precision (e.g., bitrate) and spatial precision (e.g., layers or channels).

In various implementations, the technologies disclosed in this specification are applicable, but not limited, to audio encoding of multichannel audio, where a communication system can be an audio coding system, a media server can be an audio encoder, and a client can be an audio source.

Various aspects of the present invention may be appreciated from the following enumerated example embodiments (EEEs):

EEE 1. A communication system, comprising:
a media server configured to receive a plurality of audio streams from a corresponding plurality of client devices, the media server including circuitry configured to:
rank the plurality of audio streams based on a predetermined metric,
group a first portion of the plurality of audio streams into a first set, the first portion of the plurality of audio streams being the N highest-ranked audio streams,
group a second portion of the plurality of audio streams into a second set, the second portion of the plurality of audio streams being the M lowest-ranked audio streams,
forward respective audio streams of the first set to a receiver device, and
discard respective audio streams of the second set,
wherein N and M are independent integers.

EEE 2. The communication system according to EEE 1, the circuitry further configured to:
group a third portion of the plurality of audio streams into a third set, the third portion of the plurality of audio streams being the audio streams ranked between the first portion and the second portion, and mix an audio content of the third set into one of the audio streams of the first set.

EEE 3. The communication system according to EEE 1 or 2, wherein respective ones of the plurality of audio streams include audio data and metadata, the metadata including data indicative of a weighting.

EEE 4. The communication system according to EEE 3, wherein the weighting is based on a perceptual salience.

EEE 5. The communication system according to EEE 4, wherein each stream is allocated bits wherein streams of higher salience receive equal or higher bits than streams of lower salience.

EEE 6. The communication system according to any one of EEEs 3 to 5, wherein the metadata further includes data indicating a spatial position in a scene.

EEE 7. The communication system according to any one of EEEs 3 to 6, wherein the weighting de-emphasizes content with a frequency below 1000 Hz and emphasizes content with a frequency above 4000 Hz.

EEE 8. The communication system according to any one of EEEs 1 to 7, wherein the receiver device is one of the plurality of client devices.

EEE 9. A communication method, comprising:
receiving a plurality of audio streams from a corresponding plurality of client devices;
ranking the plurality of audio streams based on a predetermined metric;
grouping a first portion of the plurality of audio streams into a first set, the first portion of the plurality of audio streams being the N highest-ranked audio streams;
grouping a second portion of the plurality of audio streams into a second set, the second portion of the plurality of audio streams being the M lowest-ranked audio streams;
forwarding respective audio streams of the first set to a receiver device; and
discarding respective audio streams of the second set,
wherein N and M are independent integers.

EEE 10. The communication method according to EEE 9, further comprising:
grouping a third portion of the plurality of audio streams into a third set, the third portion of the plurality of audio streams being the audio streams ranked between the first portion and the second portion, and
mixing an audio content of the third set into one of the audio streams of the first set.

EEE 11. The communication method according to EEE 9 or 10, wherein respective ones of the plurality of audio streams include audio data and metadata, the metadata including data indicative of a weighting.

EEE 12. The communication method according to EEE 11, wherein the weighting is based on a perceptual salience.

EEE 13. The communication method according to EEE 12, wherein each stream is allocated bits wherein streams of higher salience receive equal or higher bits than streams of lower salience.

EEE 14. The communication method according to any of EEEs 11-13, wherein the metadata further includes data indicating a spatial position in a scene.

EEE 15. The communication method according to any one of EEEs 11-14, wherein the weighting de-emphasizes content with a frequency below 1000 Hz and emphasizes content with a frequency above 4000 Hz.

EEE 16. The communication method according to any one of EEEs 9-15, wherein the receiver device is one of the plurality of client devices.

EEE 17. A non-transitory computer-readable medium storing instructions that, when executed by a processor of a media server, cause the media server to perform operations comprising:
receiving a plurality of audio streams from a corresponding plurality of client devices;
ranking the plurality of audio streams based on a predetermined metric;
grouping a first portion of the plurality of audio streams into a first set, the first portion of the plurality of audio streams being the N highest-ranked audio streams;
grouping a second portion of the plurality of audio streams into a second set, the second portion of the plurality of audio streams being the M lowest-ranked audio streams;
forwarding respective audio streams of the first set to a receiver device; and
discarding respective audio streams of the second set,
wherein N and M are independent integers.

EEE 18. The non-transitory computer-readable medium according to EEE 17, further comprising:
grouping a third portion of the plurality of audio streams into a third set, the third portion of the plurality of audio streams being the audio streams ranked between the first portion and the second portion, and
mixing an audio content of the third set into one of the audio streams of the first set.

EEE 19. The non-transitory computer-readable medium according to EEE 17 or 18, wherein respective ones of the plurality of audio streams include audio data and metadata, the metadata including data indicative of a weighting.

EEE 20. The non-transitory computer-readable medium according to EEE 19, wherein the weighting is based on a perceptual salience.

EEE 21. The non-transitory computer-readable medium according to EEE 20, wherein each stream is allocated bits wherein streams of higher salience receive equal or higher bits than streams of lower salience.

EEE 22. The non-transitory computer-readable medium according to any of EEEs 19-21, wherein the metadata further includes data indicating a spatial position in a scene.

EEE 23. The non-transitory computer-readable medium according to any one of EEEs 19-22, wherein the weighting de-emphasizes content with a frequency below 1000 Hz and emphasizes content with a frequency above 4000 Hz.

The invention claimed is:

1. A communication system, comprising:
a media server configured to receive a plurality of audio streams from a corresponding plurality of client devices, the media server including circuitry configured to:
 rank the plurality of audio streams based on a predetermined metric; wherein the metric for an audio stream comprises a weighted energy of a frame of the audio stream; wherein the weighted energy of the frame of the audio stream is determined using a weighting function which de-emphasizes spectral frequency content with a frequency below 1000 Hz and which emphasizes spectral frequency content with a frequency above 4000 Hz,
 group a first portion of the plurality of audio streams into a first set, the first portion of the plurality of audio streams being the N highest-ranked audio streams,
 group a second portion of the plurality of audio streams into a second set, the second portion of the plurality of audio streams being the M lowest-ranked audio streams,
 forward respective audio streams of the first set to a receiver device, and
 discard respective audio streams of the second set,
wherein N and M are independent integers.

2. The communication system according to claim 1, the circuitry further configured to:
group a third portion of the plurality of audio streams into a third set, the third portion of the plurality of audio streams being the audio streams ranked between the first portion and the second portion, and
mix an audio content of the third set into one of the audio streams of the first set.

3. The communication system according to claim 1, wherein respective ones of the plurality of audio streams include audio data and metadata, the metadata of an audio stream including data indicative of the weighted energy of a frame of the audio stream.

4. The communication system according to claim 3, wherein the metadata of an audio stream further includes data indicating a spatial position in a scene.

5. The communication system according to claim 1, wherein each stream to be forwarded by the server is allocated bits wherein streams of higher rank receive equal or higher bits than streams of lower rank.

6. The communication system according to claim 1, wherein the receiver device is one of the plurality of client devices.

7. A communication method, comprising:
receiving a plurality of audio streams from a corresponding plurality of client devices;
ranking the plurality of audio streams based on a predetermined metric; wherein the metric for an audio stream comprises a weighted energy of a frame of the audio stream; wherein the weighted energy of the frame of the audio stream is determined using a weighting function which de-emphasizes spectral frequency content with a frequency below 1000 Hz and which emphasizes spectral frequency content with a frequency above 4000 Hz;
grouping a first portion of the plurality of audio streams into a first set, the first portion of the plurality of audio streams being the N highest-ranked audio streams;
grouping a second portion of the plurality of audio streams into a second set, the second portion of the plurality of audio streams being the M lowest-ranked audio streams;
forwarding respective audio streams of the first set to a receiver device; and
discarding respective audio streams of the second set,
wherein N and M are independent integers.

8. The communication method according to claim 7, further comprising:
grouping a third portion of the plurality of audio streams into a third set, the third portion of the plurality of audio streams being the audio streams ranked between the first portion and the second portion, and
mixing an audio content of the third set into one of the audio streams of the first set.

9. The communication method according to claim 7, wherein respective ones of the plurality of audio streams include audio data and metadata, the metadata of an audio stream including data indicative of the weighted energy of a frame of the audio stream.

10. The communication method according to claim 9, wherein the metadata of an audio stream further includes data indicating a spatial position in a scene.

11. The communication method according to claim 7, wherein each stream is allocated bits wherein streams of higher rank receive equal or higher bits than streams of lower rank.

12. The communication method according to claim 7, wherein the receiver device is one of the plurality of client devices.

13. A non-transitory computer-readable medium storing instructions that, when executed by a processor of a media server, cause the media server to perform operations comprising:
receiving a plurality of audio streams from a corresponding plurality of client devices;
ranking the plurality of audio streams based on a predetermined metric; wherein the metric for an audio stream comprises a weighted energy of a frame of the audio stream; wherein the weighted energy of the frame of the audio stream is determined using a weighting function which de-emphasizes spectral frequency content with a frequency below 1000 Hz and which emphasizes spectral frequency content with a frequency above 4000 Hz;
grouping a first portion of the plurality of audio streams into a first set, the first portion of the plurality of audio streams being the N highest-ranked audio streams;
grouping a second portion of the plurality of audio streams into a second set, the second portion of the plurality of audio streams being the M lowest-ranked audio streams;
forwarding respective audio streams of the first set to a receiver device; and
discarding respective audio streams of the second set,
wherein N and M are independent integers.

14. The non-transitory computer-readable medium according to claim 13, further comprising:
- grouping a third portion of the plurality of audio streams into a third set, the third portion of the plurality of audio streams being the audio streams ranked between the first portion and the second portion, and
- mixing an audio content of the third set into one of the audio streams of the first set.

15. The non-transitory computer-readable medium according to claim 13, wherein respective ones of the plurality of audio streams include audio data and metadata, the metadata of an audio stream including data indicative of the weighted energy of a frame of the audio stream.

16. The non-transitory computer-readable medium according to claim 13, wherein each stream is allocated bits wherein streams of higher rank receive equal or higher bits than streams of lower rank.

17. The non-transitory computer-readable medium according to claim 13, wherein the metadata of an audio stream further includes data indicating a spatial position in a scene.

* * * * *